United States Patent
Gunda et al.

(10) Patent No.: US 9,020,992 B1
(45) Date of Patent: Apr. 28, 2015

(54) SYSTEMS AND METHODS FOR FACILITATING FILE ARCHIVING

(75) Inventors: Laxmikant Gunda, Pune (IN); Praveen Rakshe, Pune (IN)

(73) Assignee: Symantec Corporation, Mountain View, CA (US)

(*) Notice: Subject to any disclaimer, the term of this patent is extended or adjusted under 35 U.S.C. 154(b) by 837 days.

(21) Appl. No.: 12/964,497

(22) Filed: Dec. 9, 2010

(51) Int. Cl.
*G06F 17/30* (2006.01)
*G06F 12/08* (2006.01)

(52) U.S. Cl.
CPC .................................. *G06F 12/0815* (2013.01)

(58) Field of Classification Search
USPC .......................................................... 707/667
See application file for complete search history.

(56) References Cited

U.S. PATENT DOCUMENTS

| | | | | | |
|---|---|---|---|---|---|
| 5,764,972 | A | * | 6/1998 | Crouse et al. | 1/1 |
| 5,873,103 | A | * | 2/1999 | Trede et al. | 1/1 |
| 6,026,414 | A | * | 2/2000 | Anglin | 1/1 |
| 6,119,151 | A | * | 9/2000 | Cantrell et al. | 709/216 |
| 6,163,806 | A | * | 12/2000 | Viswanathan et al. | 709/229 |
| 8,028,011 | B1 | * | 9/2011 | Pawar et al. | 707/830 |
| 2007/0168398 | A1 | * | 7/2007 | Miroshnichenko et al. | 707/200 |
| 2009/0319736 | A1 | * | 12/2009 | Otani et al. | 711/162 |
| 2010/0332456 | A1 | * | 12/2010 | Prahlad et al. | 707/664 |

OTHER PUBLICATIONS

"The UNIX® System", http://www.unix.org/, as accessed Sep. 20, 2010, (1995).
"Unix", http://en.wikipedia.org/wiki/Unix, as accessed Sep. 20, 2010, Wikipedia, (Dec. 9, 2003).
"Class FileStore", http://docs.oracle.com/javase/7/docs/api/java/nio/file/FileStore.html, as accessed Sep. 20, 2010, Oracle, (1993).
"Solaris (operating system)", http://en.wikipedia.org/wiki/Solaris_(operating_system), as accessed Sep. 20, 2010, Wikipedia, (Feb. 27, 2004).
"HP", http://www.hp.com/country/us/en/uc/welcome.html, as accessed Sep. 20, 2010, Hewlett-Packard, (On or before Sep. 20, 2010).
"IBM AIX", http://en.wikipedia.org/wiki/IBM_AIX, as accessed Sep. 20, 2010, Wikipedia, (Mar. 5, 2009).
"Linux", http://en.wikipedia.org/wiki/Linux, as accessed Sep. 20, 2010, (Dec. 9, 2003).
"DMAPI", http://en.wikipedia.org/wiki/DMAPI, as accessed Sep. 20, 2010, Wikipedia, (On or before Sep. 20, 2010).
"DiskXtender for Windows", http://www.emc.com/data-protection/diskxtender-for-windows.htm, as accessed Sep. 20, 2010, EMC Corporation, (On or before Sep. 20, 2010).
"SourceOne", http://www.sourceone-energy.com/, as accessed Sep. 20, 2010, (On or before Sep. 20, 2010).

(Continued)

*Primary Examiner* — Etienne Leroux
*Assistant Examiner* — Sabana S Rahman
(74) *Attorney, Agent, or Firm* — ALG Intellectual Property, LLC

(57) ABSTRACT

A computer-implemented method may include establishing a proxy file system that facilitates file archiving for a primary file system that does not support file archiving. The computer-implemented method may also include identifying a request to archive a file stored in a primary file system and copying the file to an archive file system such that a reference to the file is created in the proxy file system. The computer-implemented method may further include replacing the file in the primary file system with a symbolic link that identifies the reference in the proxy file system. Various other methods, systems, and computer-readable media are also disclosed.

15 Claims, 7 Drawing Sheets

(56) References Cited

OTHER PUBLICATIONS

"SourceOne Archiving Family", http://www.emc.com/data-protection/emc-sourceone-archiving-family.htm, as accessed Sep. 20, 2010, EMC Corporation, (On or before Sep. 20, 2010).

"CommVault", http://www.commvault.com/, as accessed Sep. 20, 2010, (Dec. 2, 1998).

Lawler, Ryan "Mimosa Networks Debuts New Products To Make Wireless Broadband A Reality", http://techcrunch.com/2014/10/15/mimosa-networks-new-products/, (Oct. 15, 2014).

"Mimosa Networks, Inc.", http://mimosa.co/, as accessed Sep. 20, 2010, (On or before Sep. 20, 2010).

* cited by examiner

SYSTEMS AND METHODS FOR FACILITATING FILE ARCHIVING

BACKGROUND

File archiving is a data storage technique that generally involves migrating data from a primary storage device to a secondary storage device (often in an attempt to reduce storage costs). For example, a business may implement file archiving by migrating large amounts of data from disk drives located on employee-operated computers to a more cost-effective mass storage device (such as a backup server). In UNIX (or UNIX-like) systems, file archiving is typically accomplished by generating transparent placeholders that reference files stored in an archive.

Unfortunately, existing technologies for generating such transparent placeholders in UNIX (or UNIX-like) systems may suffer from one or more shortcomings. In one example, while a Data Management Application Programming Interface ("DMAPI") protocol may generate transparent placeholders in some types of UNIX systems, DMAPI may be unavailable in other types of UNIX systems. In another example, while a stackable file system may generate transparent placeholders in various types of UNIX systems, the stackable file system must be specially ported to a particular type of UNIX system within the operating system kernel.

What is needed, therefore, is a mechanism that facilitates file archiving for any type of UNIX (or UNIX-like) system in an efficient, effective manner.

SUMMARY

As will be described in greater detail below, the instant disclosure generally relates to systems and methods for facilitating file archiving for any type of UNIX (or UNIX-like) system in an efficient, effective manner. More specifically, the systems and methods described herein may facilitate access to archived files by using a proxy file system to provide archiving capabilities to a primary file system that does not support file archiving or by exposing the archived files directly to such a primary file system.

In one embodiment, a method for facilitating file archiving may include establishing a proxy file system (such as a DMAPI-enabled, UNIX-like file system) that facilitates file archiving for a primary file system (such as a UNIX-like file system) that does not support file archiving. For example, a proxy module may enable DMAPI for the proxy file system to facilitate generating or implementing references (such as transparent placeholders) that reference files stored in an archive file system. After the proxy file system has been established to facilitate file archiving for the primary file system, an identification module may identify a request to archive a file stored in the primary file system.

In response to the request to archive the file, an archiving module may copy the file to an archive file system such that a reference to the file is created in the proxy file system. For example, upon copying the file to the archive file system, the archiving module may cause the proxy file system to generate and store a reference (such as a transparent placeholder) that identifies the location where the file was copied in the archive file system. The archiving module may then replace the file stored in the primary file system with a symbolic link that identifies the reference stored in the proxy file system. By causing the proxy file system to generate the reference to the archived file and replacing the file stored in the primary file system with the symbolic link that identifies the reference, the archiving module may facilitate file archiving for the primary file system even though the primary file system does not support file archiving on its own.

After the file has been archived in the archive file system, the primary file system may identify a request initiated by an application to access a file. The request to access the file may identify a particular location where the file is expected to be stored in the primary file system. However, instead of finding the file at the location identified by the request, the primary file system may find a symbolic link that directs the request to a reference generated by and stored in the proxy file system.

In certain embodiments, the primary file system may forward the request to the reference stored in the proxy file system as directed by the symbolic link. The proxy file system may receive the request and locate the reference identified by the symbolic link stored in the primary file system. As described above, the reference stored in the proxy file system may identify the location where the file was copied in the archive file system. The proxy file system may then use the reference to locate the file in the archive file system.

In some embodiments, upon locating the file in the archive file system, the proxy file system may retrieve the file from the archive file system and cache the file. By caching the file, the proxy file system may enable the archiving module to provide the cached file to the application that initiated the request to access the file. In one example, the archiving module may provide the cached file to the application by copying the cached file to the primary file system. For example, once the application has closed the symbolic link stored in the primary file system, the archiving module may replace the symbolic link with the cached file. In this example, after the archiving module has replaced the symbolic link with the cached file, the application may access the file in the primary file system.

In another example, the archiving module may provide the cached file directly to the application from the proxy file system without copying the cached file to the primary file system. For example, the archiving module may stream the cached file to the application to facilitate access to the file without copying the file to the primary file system.

In one embodiment, a management module may determine that the amount of free storage space in the proxy file system is below a predetermined threshold. For example, as a result of caching various files in the proxy file system, the amount of free storage space in the proxy file system may fall below a predetermined threshold that represents a minimum amount of free storage space required by the proxy file system. In response to the determination that the amount of free storage space in the proxy file system is below the predetermined threshold, the management module may delete one or more cached files from the proxy file system to free up additional storage space.

In certain embodiments, another method for facilitating file archiving may include mounting an archive file system to facilitate file archiving for a primary file system that does not support file archiving. For example, a mounting module may use a Distributed Authoring and Versioning File System ("DAVFS") driver to mount the archive file system. In this example, the mounting module may then obtain access to the archive file system via a communication protocol (such as a Web-based Distributed Authoring and Versioning ("WEBDAV") protocol) that exposes the archive file system to the primary file system through the use of symbolic links.

After the archive file system has been exposed to the primary file system, an identification module may identify a request to archive a file stored in the primary file system. In response to the request to archive the file, an archiving module may copy the file to the archive file system. Upon copying the file to the archive file system, the archiving module may replace the file in the primary file system with a symbolic link that identifies the location where the file was copied in the archive file system.

By mounting the archive file system and replacing the file stored in the primary file system with the symbolic link that identifies the archived file, the mounting and archiving modules may facilitate file archiving for the primary file system even though the primary file system does not support file archiving on its own. For example, the primary file system may identify a request initiated by an application to access the file. The request to access the file may identify a particular location where the file is expected to be stored in the primary file system. However, in this example, instead of finding the file at the location identified by the request, the primary file system may find a symbolic link that directs the request to the file stored in the archive file system.

In various embodiments, the primary file system may forward the request to the archive file system as directed by the symbolic link. Upon receiving the request, the archive file system may locate the file identified by the symbolic link and then provide the archived file to an archiving module. The archiving module may receive the archived file from the archive file system to enable the application to access the file.

In one example, the archiving module may copy the archived file to the primary file system. For example, once the application has closed the symbolic link in the primary file system, the archiving module may replace the symbolic link with the archived file. In this example, upon replacing the symbolic link with the archived file, the application may access the file in the primary file system. In another example, the archiving module may stream the archived file from the archive file system to the application without copying the archived file to the primary file system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
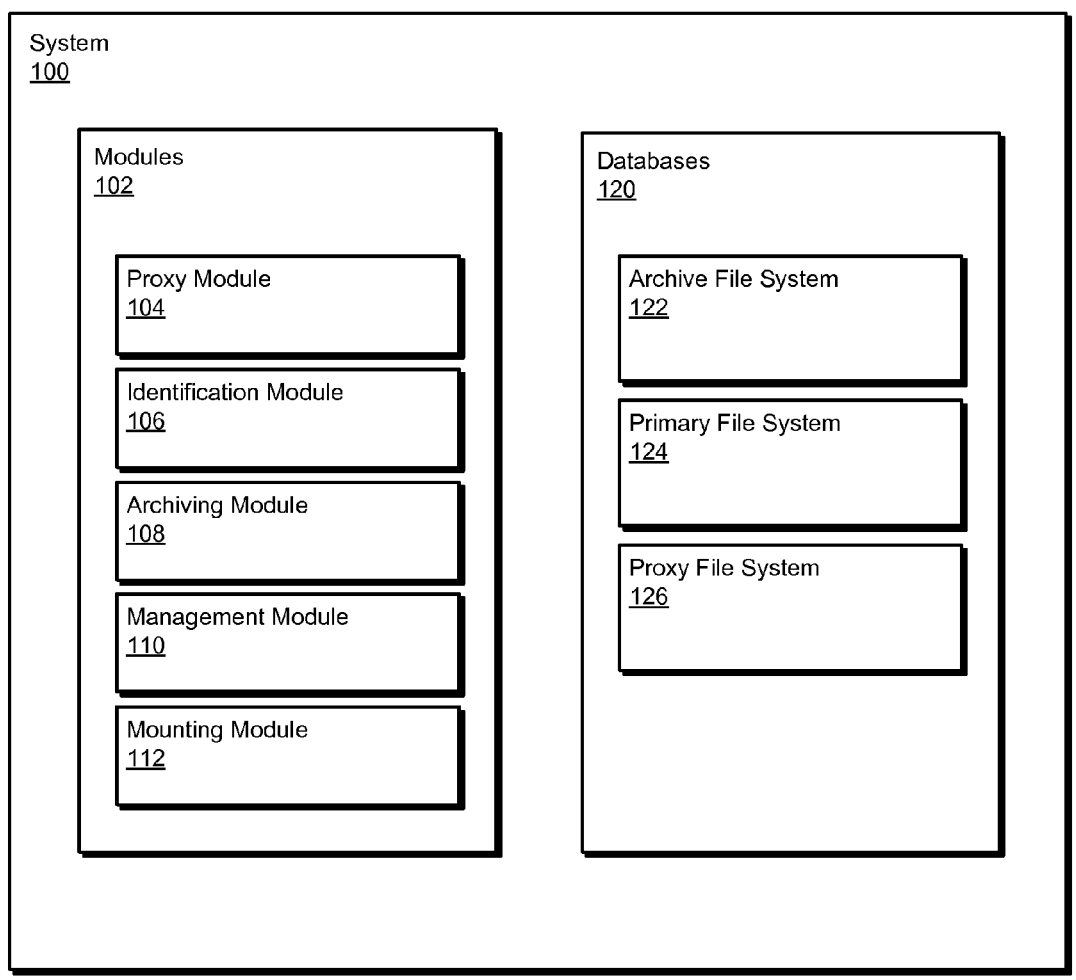
FIG. 1 is a block diagram of an exemplary system for facilitating file archiving.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for facilitating file archiving. In particular, the systems and methods described herein may enable a UNIX file system that does not generally support file archiving on its own to achieve archiving capabilities through additional means. For example, a UNIX file system may be unable to support conventional file archiving techniques due to its inability to generate transparent placeholders that reference archived files.

In one embodiment, the UNIX file system may achieve such file archiving capabilities by taking advantage of the archiving capabilities of a UNIX proxy file system that supports file archiving. For example, the UNIX file system may provide a file to the UNIX proxy file system, and the UNIX proxy file system may copy the file to an archive. The UNIX proxy file system may then generate and store a reference that identifies the location where the file was copied in the archive.

In addition, the UNIX file system may replace the file that was copied to the archive with a symbolic link that identifies the reference stored in the UNIX proxy file system. By replacing the file stored in the UNIX file system with the symbolic link that identifies the reference stored in the UNIX proxy file system, the UNIX file system may enable an application to access the archived file even though the UNIX file system does not support file archiving on its own.

In another embodiment, the UNIX file system may achieve such file archiving capabilities by being exposed to an archive that has been mounted on the same computing device as the UNIX file system. As part of mounting the archive, a communication protocol (such as WEBDAV) may expose the archive to the UNIX file system through the use of symbolic links. After the archive has been exposed to the UNIX file system, the UNIX file system may copy the file to the archive.

The UNIX file system may then replace the file that was copied to the archive with a symbolic link that identifies the location where the file was copied in archive. By replacing the file stored in the UNIX file system with the symbolic link after the archive has been exposed to the UNIX file system via the WEBDAV communication protocol, the UNIX file system may enable an application to access the archived file even though the UNIX file system does not support file archiving on its own.

Figure 2:
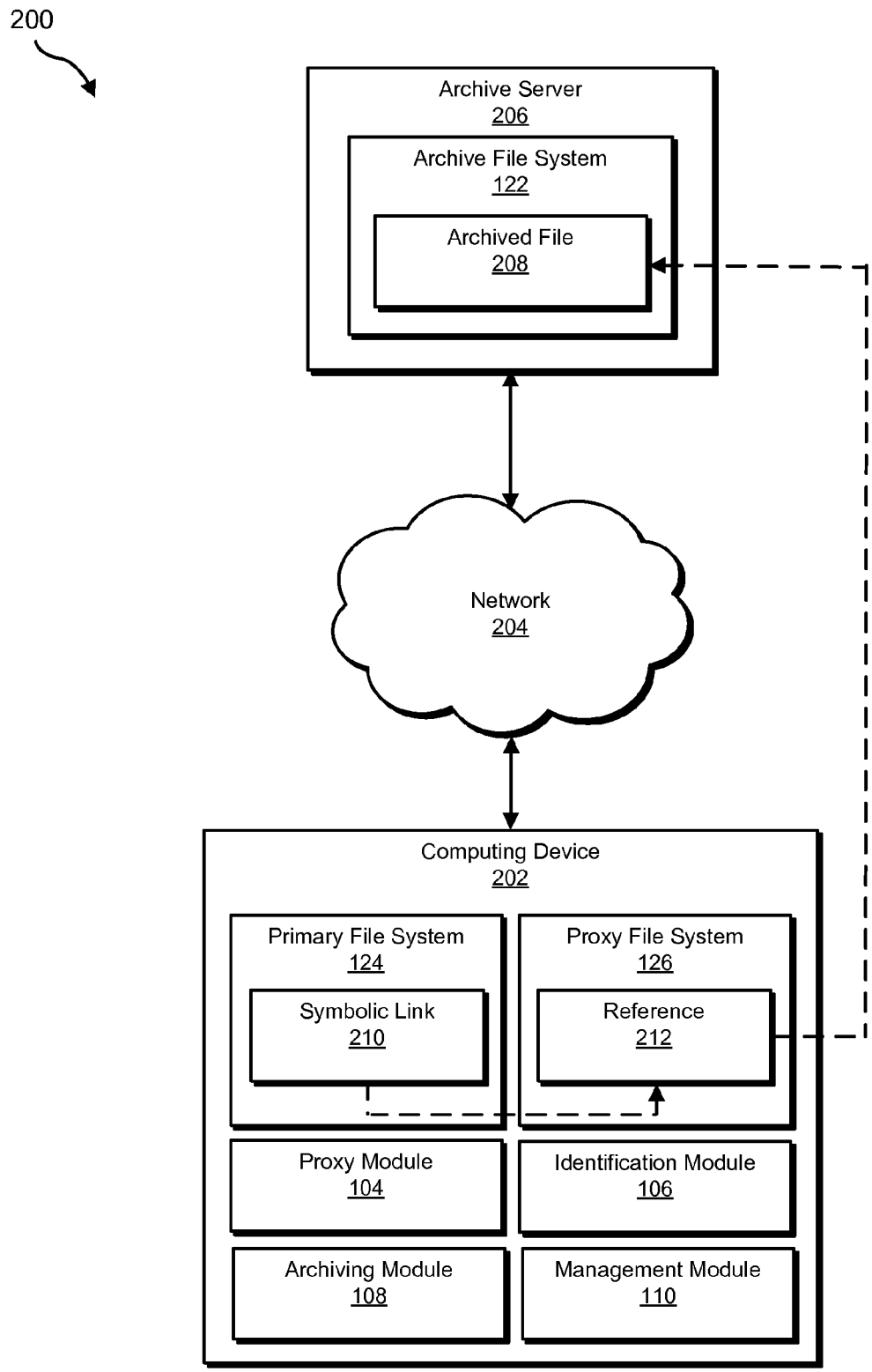
FIG. 2 is a block diagram of an exemplary system for facilitating file archiving.
Figure 3:
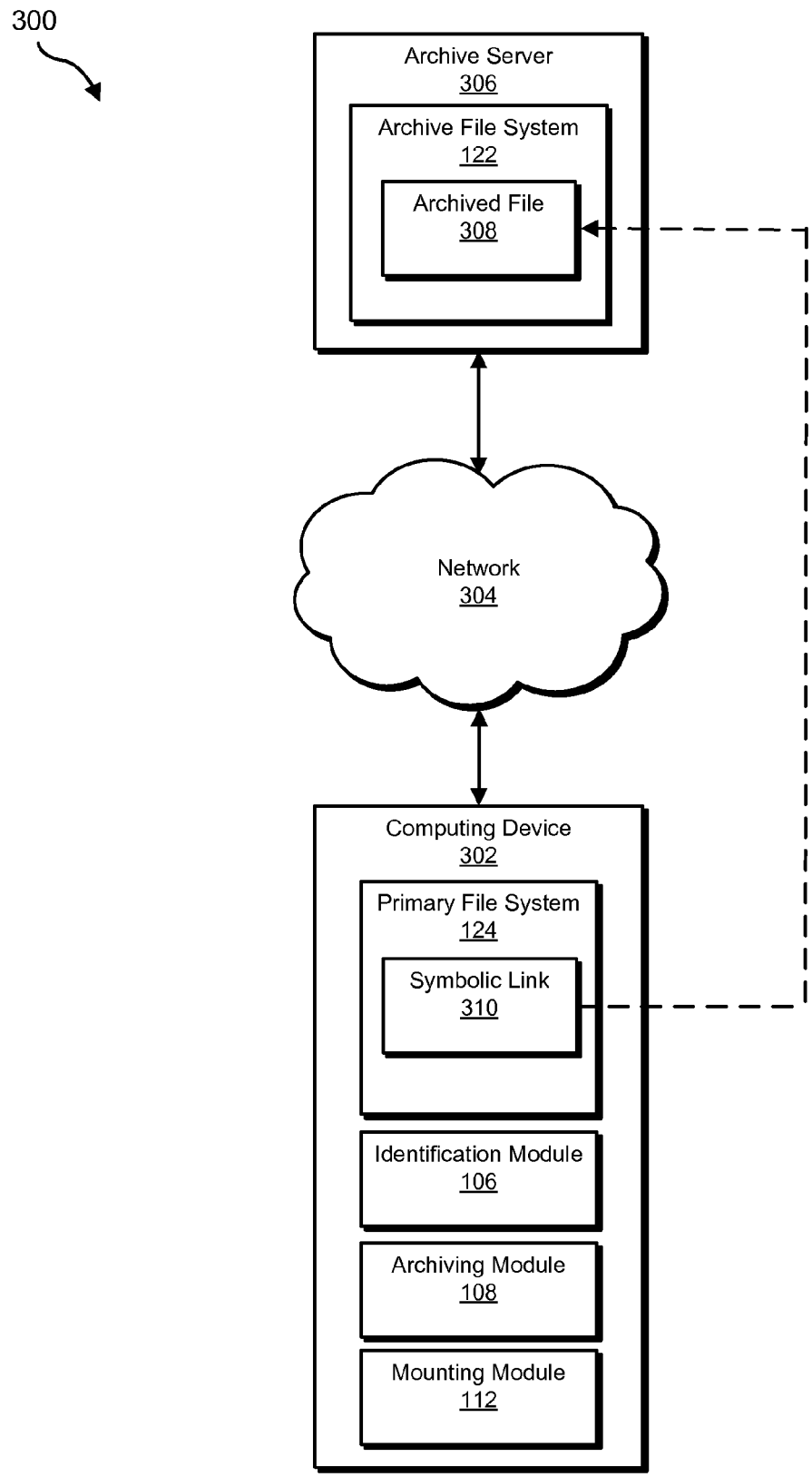
FIG. 3 is a block diagram of an exemplary system for facilitating file archiving.

The following will provide, with reference to FIGS. 1-3, detailed descriptions of exemplary systems for facilitating file archiving. Detailed descriptions of corresponding computer-implemented methods will also be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for facilitating file archiving. As illustrated in this figure, exemplary system 100 may include one or more modules 102 for performing one or more tasks that facilitate file archiving. For example, exemplary system 100 may include a proxy module 104 programmed to establish a proxy file system that facilitates file archiving for a primary file system that does not support file archiving.

As will be described in greater detail below, exemplary system 100 may also include an identification module 106 programmed to identify a request to archive a file stored in a primary file system. In addition, exemplary system 100 may include an archiving module 108 programmed to copy the file to an archive file system such that a reference to the file is created in the proxy file system. In some embodiments, archiving module 108 may also be programmed to replace the file in the primary file system with a symbolic link that identifies the reference in the proxy file system.

In various embodiments, one or more of modules 102 may also perform one or more tasks that facilitate accessing files that have been archived. For example, identification module 106 may be programmed to identify a request initiated by an application to access the file that was copied to the archive file system. In addition, identification module 106 may be programmed to find (at the location where the file was stored in the primary file system prior to being archived) the symbolic link that directs the request to the reference created in the proxy file system.

In some embodiments, archiving module 108 may also be programmed to use the reference stored in the proxy file system to locate the file stored in the archive. Archiving module 108 may be further programmed to retrieve the file from the archive to cache the file in the proxy file system. In addition, archiving module 108 may be programmed to provide the cached file to the application that initiated the request to access the file.

In some embodiments, exemplary system 100 may include a management module 110 programmed to determine that the amount of free space in the proxy file system is below a predetermined threshold. Management module 110 may also be programmed to delete one or more cached files from the proxy file system in response to the determination that the amount of free storage space in the proxy file system is below the predetermined threshold.

In certain embodiments, as will be described in greater detail below, exemplary system 100 may also include a mounting module 112 programmed to mount an archive file system to facilitate file archiving for a primary file system that does not support file archiving. Mounting module 112 may be further programmed to obtain access to the archive file system via a communication protocol (such as WEBDAV) that exposes the archive file system to the primary file system through the use of symbolic links. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or archive server 206), the devices illustrated in FIG. 3 (e.g., computing device 302 and/or archive server 306), computing system 610 in FIG. 6, and/or portions of exemplary network architecture 700 in FIG. 7. One or more of modules 102 in FIG. 1 may also represent all or portions of one or more special-purpose computers configured to perform one or more tasks.

In addition, one or more of modules 102 in FIG. 1 may operate in conjunction with one or more of databases 120 in FIG. 1 (e.g., archive file system 122, primary file system 124, and/or proxy file system 126). Although not illustrated in FIG. 1, one or more of modules 102 may represent a portion of one or more of databases 120. One or more of modules 102 may also cause one or more of databases 120 to perform various functions or tasks. For example, identification module 106 may be programmed to cause primary file system 124 to identify a request to access a file.

As illustrated in FIG. 1 and indicated above, exemplary system 100 may also include one or more databases 120. Databases 120 may represent portions of a single database, computing device, or file system, or a plurality of databases, computing devices, or file systems. In one embodiment, exemplary system 100 may include an archive file system 122 configured to store and manage archived files referenced by symbolic links stored in a primary file system (such as primary file system 124 in FIG. 1) and/or by references stored in a proxy file system (such as proxy file system 126 in FIG. 1).

In addition, exemplary system 100 may include a primary file system 124 configured to store and manage files and symbolic links that identify archived files stored in archive file system 122 and/or references stored in a proxy file system (such as proxy file system 126). Exemplary system 100 may also include a proxy file system 126 configured to store and manage cached files and references that identify archived files stored in archive file system 122. As discussed above, references stored in proxy file system 126 may also be identified by symbolic links stored in primary file system 124.

Databases 120 in FIG. 1 may represent a portion of one or more computing devices. For example, databases 120 may represent a portion of archive server 206 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as computing device 202 in FIG. 2, archive server 206 in FIG. 2, computing device 302 in FIG. 3, archive server 306 in FIG. 3, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of exemplary system 200 in FIG. 2. As shown in FIG. 2, system 200 may include a computing device 202 in communication with an archive server 206 via a network 204. In some embodiments, and as will be described in greater detail below, computing device 202 may be programmed by proxy module 104 to establish a proxy file system (such as proxy file system 126 in FIG. 1) that facilitates file archiving for a primary file system (such as primary file system 124 in FIG. 1) that does not support file archiving.

In certain embodiments, computing device 202 may be programmed by identification module 106 to identify a request to archive a file stored in primary file system 124. In one or more embodiments, computing device 202 may be programmed by archiving module 108 to copy the file to archive file system 122 such that a reference 212 to the file is created in proxy file system 126. Computing device 202 may also be programmed by archiving module 108 to replace the file stored in primary file system 124 with a symbolic link 210 that identifies reference 212 created in proxy file system 126. Computing device 202 may be further programmed by identification module 106 to identify a request initiated by an application to access a file.

In addition, computing device 202 may be programmed by identification module 106 to find, in primary file system 124, symbolic link 210 that directs the request to reference 212 stored in proxy file system 126. In some embodiments, computing device 202 may be programmed by archiving module 108 to use reference 212 stored in proxy file system 126 to locate an archived file 208 stored in archive file system 122. Computing device 202 may be further programmed by archiving module 108 to retrieve archived file 208 from archive file system 122 to cache the file in proxy file system 126. In addition, computing device 202 may be programmed by archiving module 108 to provide the cached file to the application that initiated the request to access the file.

Similarly, all or a portion of exemplary system 100 may represent portions of exemplary system 300 in FIG. 3. As shown in FIG. 3, exemplary system 300 may include a computing device 302 in communication with an archive server 306 via a network 304. In certain embodiments, computing device 302 may be programmed by mounting module 112 to mount an archive file system (such as archive file system 122 in FIG. 1) to facilitate file archiving for a primary file system (such as primary file system 124 in FIG. 1) that does not support file archiving. Computing device 302 may also be programmed by mounting module 112 to obtain access to archive file system 122 via a communication protocol (such as WEBDAV) that exposes archive file system 122 to primary file system 124 through the use of symbolic links.

In such embodiments, computing device 302 may be programmed by identification module 106 to identify a request initiated by an application to access a file and then to find a symbolic link 310 in place of the file at a location in primary file system 124. Computing device 302 may be programmed by archiving module 108 to forward the request to archive file system 122 as directed by symbolic link 310 found in place of the file at the location in primary file system 124. In addition, computing device 302 may be programmed by archiving module 108 to receive an archived file 308 from archive file system 122 to enable the application to access the file.

Computing devices 202 and 302 generally represent any type or form of computing device capable of reading computer-executable instructions. Examples of computing devices 202 and 302 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Archive servers 206 and 306 generally represent any type or form of computing device capable of facilitating file archiving and providing database services to an additional computing device (such as computing device 202 or 302) via a network (such as network 204 or 304). Such database services may include storage and distribution of archived files requested by the additional computing device. Examples of archive servers 206 and 306 include, without limitation, application servers and database servers configured to provide various database services and/or run certain software applications.

Networks 204 and 304 generally represent any medium or architecture capable of facilitating communication or data transfer. Examples of networks 204 and 304 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Networks 204 and 304 may facilitate communication or data transfer using wireless or wired connections. In one embodiment, networks 204 and 304 may facilitate communication between a computing device (such as computing device 202 or 302) and an archive server (such as archive server 206 or 306).

Figure 4:
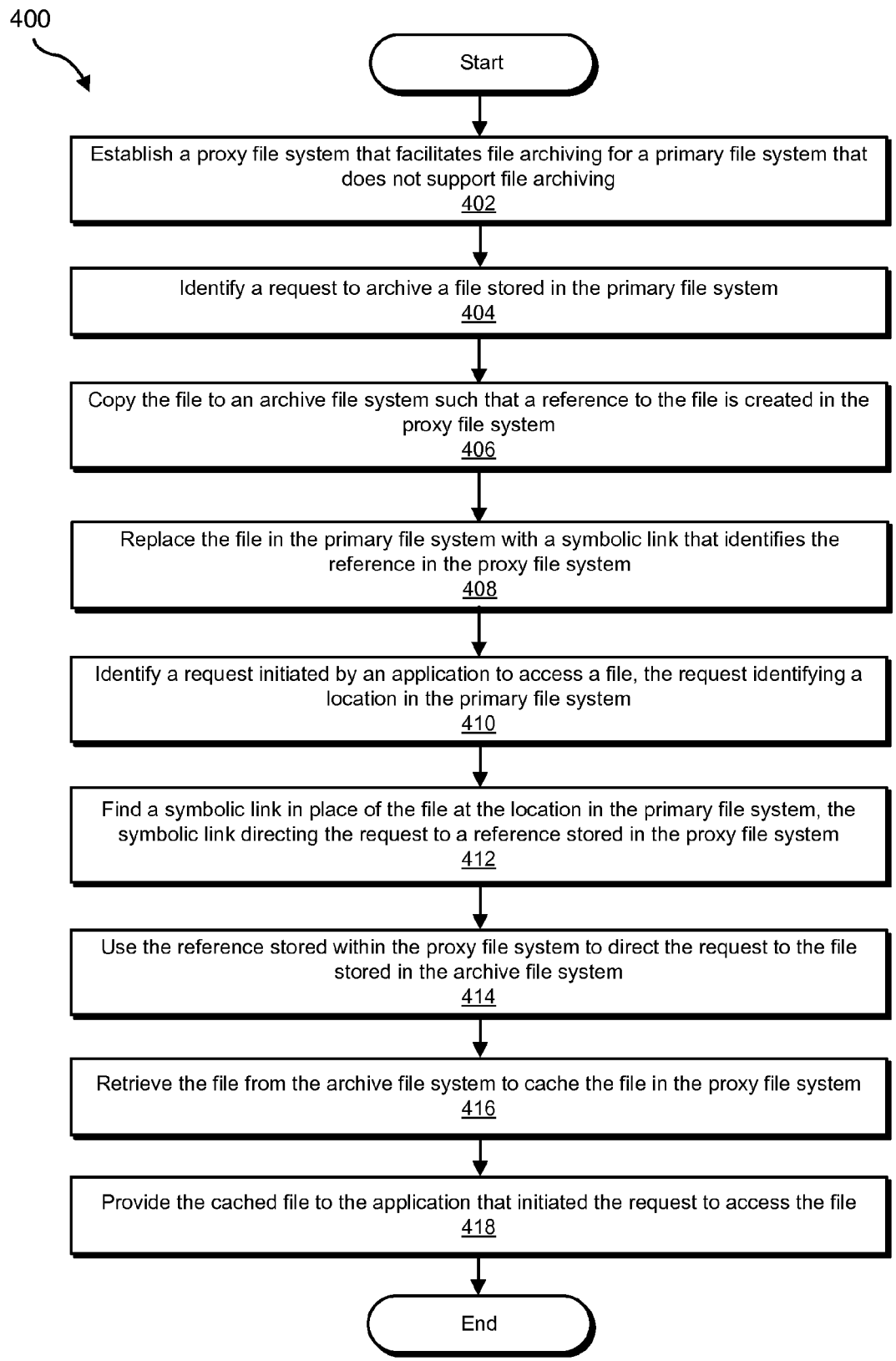
FIG. 4 is a flow diagram of an exemplary method for facilitating file archiving.

FIG. 4 is a flow diagram of an exemplary computer-implemented method 400 for facilitating file archiving. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, and/or system 300 in FIG. 3.

As illustrated at step 402 in FIG. 4, the various systems described herein may establish a proxy file system (such as a UNIX or UNIX-like file system) that facilitates file archiving for a primary file system (such as a UNIX or UNIX-like file system) that does not support file archiving. For example, proxy module 104 may, as part of computing device 202 in FIG. 2, establish proxy file system 126 that facilitates file archiving for primary file system 124, which does not support file archiving on its own. In this example, primary file system 124 may be unable to support file archiving on its own because primary file system 124 lacks the DMAPI functionality for implementing references (such as transparent placeholders) that reference archived files.

The term "file archiving," as used herein, generally refers to any type of data transfer (or data storage) technique that involves migrating data from at least one computing (or storage) device to at least one additional computing (or storage) device and replacing the migrated data with a placeholder (e.g., a reference, a file stub, etc). In addition, the term "DMAPI," as used herein, generally refers to the interface described in the X/Open document "Systems Management: Data Storage Management (XDSM) API" dated February 1997. DMAPI may be enabled or disabled on various file systems, including, for example, XFS, IBM's Journaling File System ("JFS"), VERITAS File System ("VXFS"), ADVFS, and General Parallel File System ("GPFS").

The systems described herein may perform step 402 in a variety of ways. In one example, proxy module 104 may set up proxy file system 126 on computing device 202 to generate or implement reference 212, which identifies a file (e.g., any type of executable, data, or compressed file) stored in archive file system 122 located on archive server 206. For example, proxy module 104 may enable DMAPI for proxy file system 126 to generate or implement a transparent placeholder that references archived file 208 stored in archive file system 122 located on archive server 206. In other examples, proxy module 104 may support, manage, control, or otherwise maintain proxy file system 126 as needed to facilitate file archiving for primary file system 124.

As will be described in greater detail below, reference 212 stored in proxy file system 126 may be referenced by symbolic link 210 stored in primary file system 124. The term "symbolic link," as used herein, generally refers to any type of file and/or other data structure whose data may be an absolute or relative path that identifies an additional file, reference, or directory.

In some embodiments, archive file system 122, primary file system 124, and/or proxy file system 126 may be a UNIX file system. The terms "UNIX" and "UNIX-like" may be used interchangeably throughout the instant disclosure. As such, the terms "UNIX file system" and "UNIX-like file system," as used herein, generally refer to any type of file system whose source code derives at least in part from the original UNIX design or UNIX source code developed by AT&T, any type of file system that satisfies the Single UNIX Specification ("SUS"), any type of file system implemented by a UNIX or UNIX-like operating system, or any type of file system that behaves similar to a UNIX file system.

Although not illustrated in FIG. 4, proxy module 104 may, in some embodiments, establish the proxy file system on a computing device that is separate from the computing device on which the primary file system is located. In one example, the primary file system, the proxy file system, and the archive file system may each be located on a separate computing device. In another example, proxy module 104 may establish the proxy file system on the same computing device as the archive file system.

As illustrated at step 404 in FIG. 4, the various systems described herein may identify a request to archive a file stored in the primary file system. For example, identification module 106 may, as part of computing device 202, identify a request to archive a file stored in primary file system 124. In this example, the request may identify a location where the file to be archived is currently stored in primary file system 124.

The systems described herein may perform step 404 in a variety of ways. For example, identification module 106 may monitor computing device 202 to identify the request to archive the file as the request is initiated. In one embodiment, a user of computing device 202 may initiate the request to archive the file stored in primary file system 124. In another embodiment, an application being executed by computing device 202 may initiate the request to archive the file stored in primary file system 124. The term "application," as used herein, may refer to any executable program, operating system, or any other type of software capable of initiating a request to archive a file or a request to access a file.

As illustrated at step 406 in FIG. 4, the various systems described herein may copy the file to an archive file system such that a reference to the file is created in the proxy file system. For example, archiving module 108 may, as part of computing device 202, copy the file stored in primary file system 124 to archive file system 122 such that reference 212 is created in proxy file system 126. In this example, reference 212 may be a transparent placeholder that identifies the location where the file was copied in proxy file system 126.

The systems described herein may perform step 406 in a variety of ways. In one example, archiving module 108 may locate the file stored in primary file system 124 and then archive the file in archive file system 122. Upon archiving the file in proxy file system 126, the file may become archived file 208. Examples of archived file 208 include, without limitation, an executable file, a data file, a compressed file, or any other type of file capable of being archived.

In certain embodiments, archiving module 108 may copy the file to proxy file system 126 prior to archiving the file in archive file system 122. In such embodiments, archiving module 108 may cause proxy file system 126 to initiate an archiving procedure that archives the file in archive file system 122. In such examples, as described above, reference 212 may be a transparent placeholder stored in proxy file system 126 and referenced by symbolic link 210 stored in primary file system 124.

As illustrated at step 408 in FIG. 4, the various systems described herein may replace the file in the primary file system with a symbolic link that identifies the reference in the proxy file system. For example, archiving module 108 may, as part of computing device 202, replace the file in primary file system 124 with symbolic link 210 that identifies reference 212 stored in proxy file system 126. In this example, symbolic link 210 may identify reference 212 by indicating the location where reference 212 is stored in proxy file system 126.

The systems described herein may perform step 408 in a variety of ways. In one example, once the file has been archived in archive file system 122, archiving module 108 may delete the file from primary file system 124 and create symbolic link 210 in the location where the file was previously stored in primary file system 124. In another example, archiving module 108 may cause the primary file system 124 to delete the file and create symbolic link 210 in place of the file.

As detailed above, steps 402-408 of exemplary method 400 describe how system 200 may be configured to enable primary file system 124 to harness the file archiving capabilities of proxy file system 126. In particular, steps 402-408 describe how system 200 may facilitate file archiving for primary file system 124 such that, when an application initiates a request to access a file that has been archived, the archived file may be transparently accessed by the application. As will be detailed below, steps 410-418 of exemplary method 400 describe how a file that has been archived (such as archived file 208) may be transparently accessed when an application initiates a request to access the file.

As illustrated at step 410 in FIG. 4, the various systems described herein may identify a request initiated by an application to access a file. For example, identification module 106 may, as part of primary file system 124 located on computing device 202, identify a request initiated by an application to access a file stored at a particular location in primary file system 124. In this example, the request initiated by the application may identify a location where the file is expected to be stored in primary file system 124. In several embodiments, the application that initiated the request may be executed by computing device 202.

The systems described herein may perform step 410 in a variety of ways. In one example, identification module 106 may identify the request as primary file system 124 receives the request from the application. For example, after the application has initiated the request, identification module 106 may identify the request as primary file system 124 is prompted to provide access to the location identified by the request.

In some embodiments, the request identified by identification module 106 may contain a reference that indicates the location in primary file system 124 where the file is expected to be stored. Examples of this reference contained within the request include, without limitation, an absolute path, a relative path, a Uniform Resource Locator ("URL"), or any other reference capable of indicating a location in a file system.

In some embodiments, a user of computing device 202 may direct the application to initiate the request to access the file. For example, a user of computing device 202 may attempt to open a file displayed in a dialog box on a monitor of computing device 202. In this example, the user's attempt to open the file may cause the application to initiate the request to access the file. In other embodiments, the application may initiate the request on its own as part of a scheduled task and/or other process.

As illustrated at step 412 in FIG. 4, the various systems described herein may find a symbolic link in place of the file at the location in the primary file system. For example, identification module 106 may, as part of primary file system 124 located on computing device 202, find symbolic link 210 at the location where the requested file was previously stored in primary file system 124 prior to being archived in archive file system 122. In this example, symbolic link 210 found at the location in primary file system 124 may direct the request to reference 212 stored in proxy file system 126. As explained above, reference 212 may be a transparent placeholder implemented by the DMAPI functionality enabled for proxy file system 126.

The systems described herein may perform step 412 in a variety of ways. In one example, upon identifying the location indicated by the request, identification module 106 may access the location in primary file system 124 in an attempt to service the request. In this example, identification module 106 may determine that symbolic link 210 (rather than the requested file) is stored at the location indicated by the request.

As illustrated at step 414 in FIG. 4, the various systems described herein may use the reference stored in the proxy file system to locate the file stored in the archive file system. For example, archiving module 108 may, as part of proxy file system 126 located on computing device 202, use reference 212 stored in proxy file system 126 to locate archived file 208 stored in archive file system 122 located on archive server 206.

The systems described herein may perform step 414 in a variety of ways. In one example, archiving module 108 may locate reference 212 identified by symbolic link 210 found in place of the requested file in primary file system 124. In this example, archiving module 108 may then cause proxy file system 126 to relay the request to archived file 208 stored in archive file system 122 as directed by reference 212 stored in proxy file system 126.

As illustrated at step 416 in FIG. 4, the various systems described herein may retrieve the archived file from the archive file system to cache the file in the proxy file system. For example, archiving module 108 may, as part of proxy file system 126 located on computing device 202, retrieve archived file 208 from archive file system 122 located on archive server 206. In this example, upon retrieving archived file 208 from archive file system 122, archiving module 108 may cache the file in proxy file system 126.

The systems described herein may perform step 416 in a variety of ways. In one example, archive server 206 may allow archiving module 108 to access archive file system 122 to retrieve archived file 208. In another example, archiving module 108 may send the request to archive server 206, and upon locating archived file 208 in archive file system 122, archive server 206 may send the file to computing device 202 in response to the request.

Archiving module 108 may store (or cache) the file in proxy file system 126 to facilitate providing the file to the application that initiated the request to access the file. As such, proxy file system 126 may serve as a cache that stores one or more files retrieved from archive file system 122. In some embodiments, archiving module 108 may associate the cached file with the reference used to identify the file in archive file system 122.

As illustrated at step 418 in FIG. 4, the various systems described herein may provide the cached file to the application that initiated the request to access the file. For example, archiving module 108 may, as part of proxy file system 126 located on computing device 202, provide the cached file retrieved from archive file system 122 to the application that initiated the request to access the file. In some embodiments, archiving module 108 may delete the cached file from proxy file system 126 immediately upon providing the cached file to the application. In other embodiments, proxy file system 126 may continue to store the cached file even after archiving module 108 has provided the cached file to the application.

The systems described herein may perform step 418 in a variety of ways. In one example, archiving module 108 may copy the cached file to primary file system 124 to enable the application to access the file in primary file system 124. For example, archiving module 108 may determine that the application has closed the symbolic link stored in primary file system 124. In this example, upon determining that the application has closed the symbolic link, archiving module 108 may replace the symbolic link with the cached file.

In another example, archiving module 108 may provide the cached file directly to the application from proxy file system 126 without copying the cached file to primary file system 124. For example, archiving module 108 may stream the cached file to the application to facilitate access to the file without copying the file to primary file system 124. Upon completion of step 418, exemplary method 400 in FIG. 4 may terminate.

Although not illustrated in FIG. 4, method 400 may also include one or more additional steps for facilitating file archiving. In one example, management module 110 may, as part of computing device 202, determine that the amount of free storage space in proxy file system 126 is below a predetermined threshold. For example, as a result of caching various files in primary file system 124, the amount of free storage space in primary file system 124 may fall below a predetermined threshold that represents a minimum amount of free storage space required by proxy file system 126. In this example, management module 110 may delete one or more cached files from proxy file system 126 to free up additional storage space in response to the determination that the amount of free storage space on proxy file system 126 is below the predetermined threshold.

Figure 5:
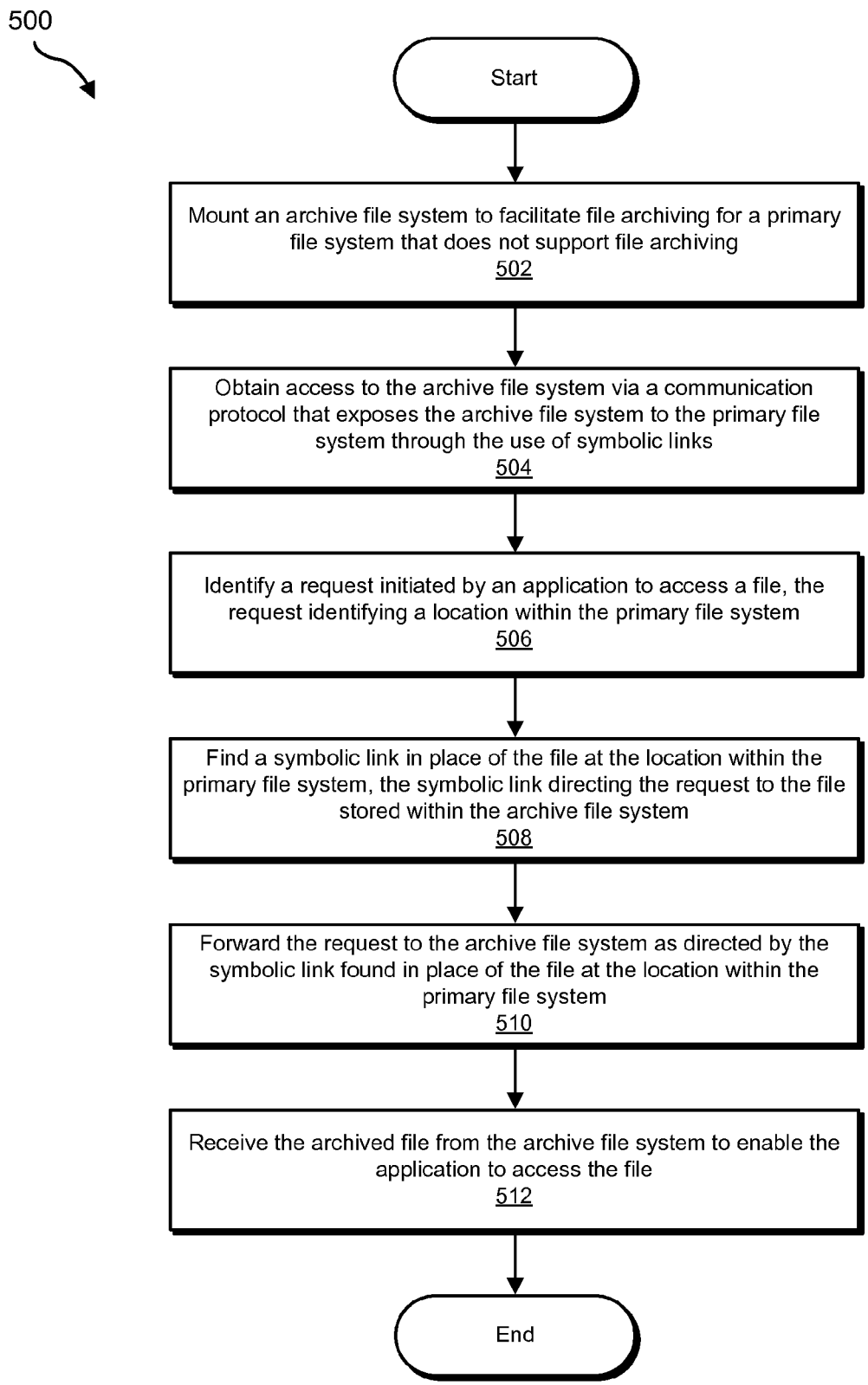
FIG. 5 is a flow diagram of an additional exemplary method for facilitating file archiving.

FIG. 5 is a flow diagram of another exemplary computer-implemented method 500 for facilitating file archiving. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, and/or system 300 in FIG. 3.

As illustrated at step 502 in FIG. 5, the various systems described herein may mount an archive file system (such as a UNIX or UNIX-like file system) to facilitate file archiving for a primary file system (such as a UNIX or UNIX-like file system) that does not support file archiving. For example, mounting module 112 may, as part of computing device 302, mount archive file system 122 to facilitate file archiving for primary file system 124, which does not support file archiving on its own. In this example, as described above, primary file system 124 may be unable to support file archiving on its own because primary file system 124 lacks the DMAPI functionality for implementing references (such as transparent placeholders) that reference archived files.

The systems described herein may perform step 502 in a variety of ways. In one example, mounting module 112 may program an operating system located on computing device 302 to present archive file system 122 within a particular directory. For example, the operating system may show archive file system 122 in directory "\root\users\archive." In this example, the mounting module 112 may use a Distributed Authoring and Versioning File System ("DAVFS") driver (such as the file system driver DAVFS2) to mount archive file system 122 located on archive server 306. The term "DAVFS," as used herein, generally refers to the file system driver DAVFS2 or any other file system driver capable of mounting a remote file system (such as archive file system 122 located on archive server 306) on a local computing device (such as computing device 302) to enable standard applications without WEBDAV support to edit files and/or other resources stored in the remote file system located on a WEBDAV server (e.g., archive server 306).

As illustrated at step 504 in FIG. 5, the various systems described herein may obtain access to the archive file system via a communication protocol that exposes the archive file system to the primary file system. This communication protocol may use symbolic links that reference files stored in the archive file system to provide access to the archive file system. For example, mounting module 112 may, as part of computing device 302, obtain access to archive file system 122 via the WEBDAV communication protocol. The term "WEBDAV," as used herein, generally refers to the communication protocol described in "RFC 4918: HTTP Extensions for Web Distributed Authoring and Versioning (WebDAV)" dated June 2007.

The systems described herein may perform step 504 in a variety of ways. For example, the WEBDAV communication protocol may provide access to files stored in archive file system 122 through the use of symbolic links (such as symbolic link 310) stored in primary file system 124. In this example, as described above, each symbolic link stored in primary file system 124 may contain a reference that identifies a file (such as archived file 308) stored in archive file system 122.

As illustrated at step 506 in FIG. 5, the various systems described herein may identify a request initiated by an application to access a file. For example, identification module 106 may, as part of primary file system 124 located on computing device 302, identify a request initiated by an application to access a file expected to be stored in primary file system 124. In this example, the request initiated by the application may identify a location where the file is expected to be stored in primary file system 124. In various embodiments, the application that initiated the request may be executed by computing device 302.

The systems described herein may perform step 506 in a variety of ways. In one example, identification module 106 may identify the request as primary file system 124 receives the request from the application. For example, after the application has initiated the request, identification module 106 may identify the request as primary file system 124 is prompted to provide access to the location identified by the request.

In some embodiments, the request identified by identification module 106 may contain a reference that indicates the location in primary file system 124 where the file is expected to be stored. Examples of this reference contained within the request include, without limitation, an absolute path, a relative path, a Uniform Resource Locator ("URL"), or any other reference capable of indicating a location in a file system.

As illustrated at step 508 in FIG. 5, the various systems described herein may find a symbolic link in place of the file at the location in the primary file system. For example, identification module 106 may, as part of primary file system 124 located on computing device 302, find symbolic link 310 at the location where the requested file was previously stored in primary file system 124 prior to being archived in archive file system 122. In this example, symbolic link 310 found at the location in primary file system 124 may direct the request to archived file 308 stored in archive file system 122 located on archive server 306.

The systems described herein may perform step 508 in a variety of ways. In one example, upon identifying the location indicated by the request, identification module 106 may access the location in primary file system 124 in an attempt to service the request. In this example, identification module 106 may determine that symbolic link 310 (rather than the requested file) is stored at the location indicated by the request.

Although not detailed in FIG. 5, archived file 308 may have been archived in archive file system 122 in a variety of ways, including any of those described above in connection with step 406. In addition, symbolic link 310 may have been created by primary file system 124 in a variety of ways, including any of those described above in connection with step 408.

As illustrated at step 510 in FIG. 5, the various systems described herein may forward the request to the archive file system as directed by the symbolic link found in place of the file at the location in the primary file system. For example, archiving module 108 may, as part of computing device 302, forward the request to archived file 308 stored in archive file system 122 as directed by symbolic link 310 found in place of the file at the location identified by the request. In this example, archive server 306 may receive the request and locate archived file 308 in archive file system 122.

The systems described herein may perform step 510 in a variety of ways. In one example, archiving module 108 may use symbolic link 310 to direct the request to archived file 308 stored in archive file system 122. In this example, archive server 306 may retrieve archived file 308 from archive file system 122 and then provide the file to the application that initiated the request to access the file.

As illustrated at step 512 in FIG. 5, the various systems described herein may receive the archived file from the archive file system to enable the application to access the file. For example, archiving module 108 may, as part of computing device 302, receive archived file 308 from archive file system 122 to enable the application to access the file.

The systems described herein may perform step 512 in a variety of ways. In some examples, archiving module 108 may copy archived file 308 to primary file system 124 to enable the application to access the file in primary file system 124. For example, archiving module 108 may determine that the application has closed symbolic link 310 stored in primary file system 124. In this example, upon determining that the application has closed symbolic link 310, archiving module 108 may replace symbolic link 310 with archived file 308.

In other examples, archiving module 108 may stream archived file 308 directly to the application from archive file system 122 without copying archived file 308 to primary file system 124. For example, archiving module 108 may stream archived file 308 to the application to facilitate access to the file without copying the file to primary file system 124. Upon completion of step 512, exemplary method 500 in FIG. 5 may terminate.

Figure 6:
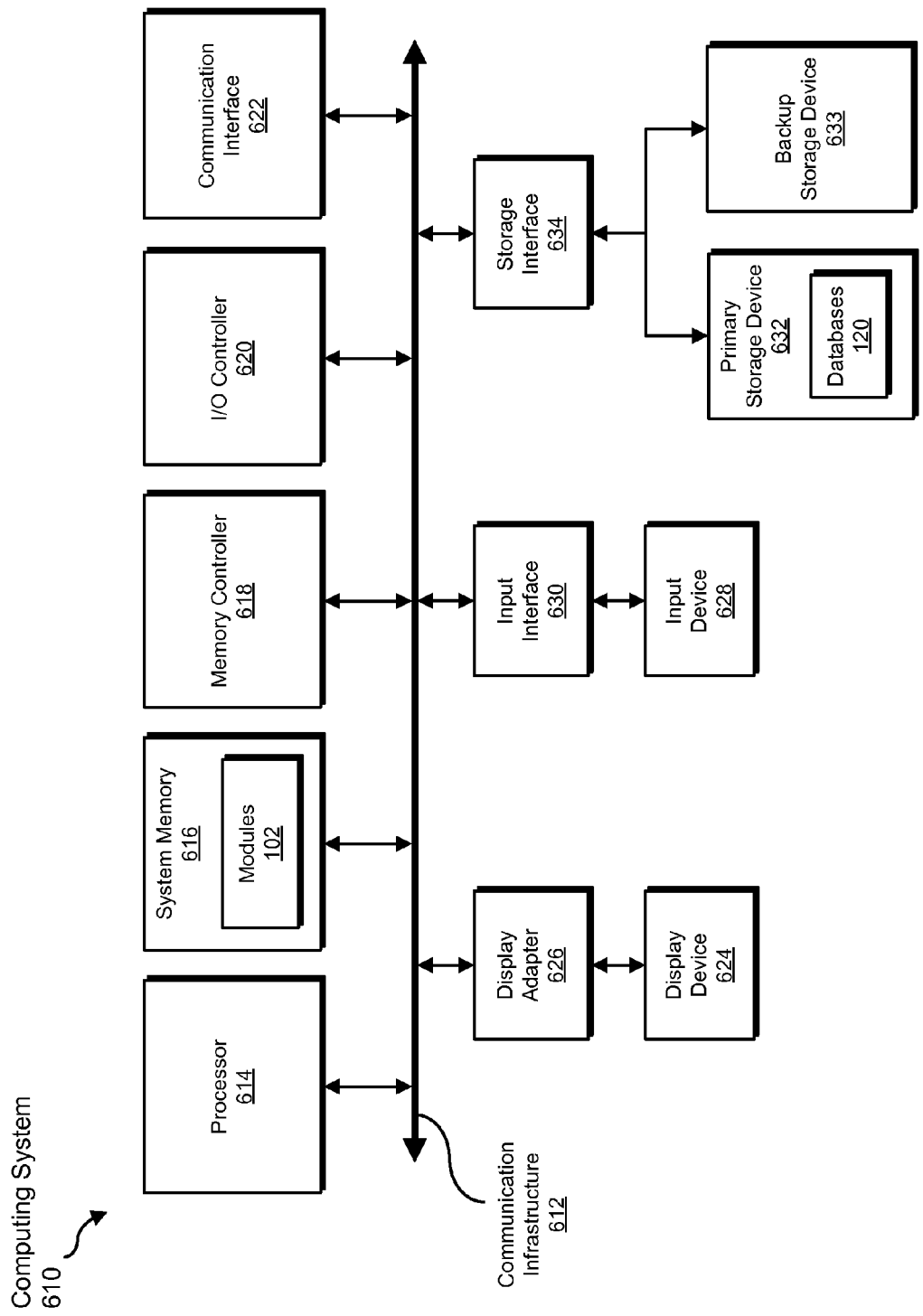
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the establishing, identifying, finding, using, directing, retrieving, providing, copying, replacing, determining, deleting, enabling, mounting, obtaining, forwarding, receiving steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as establishing, identifying, finding, using, directing, retrieving, providing, copying, replacing, determining, deleting, enabling, mounting, obtaining, forwarding, receiving.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the establishing, identifying, finding, using, directing, retrieving, providing, copying, replacing, determining, deleting, enabling, mounting, obtaining, forwarding, receiving steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the establishing, identifying, finding, using, directing, retrieving, providing, copying, replacing, determining, deleting, enabling, mounting, obtaining, forwarding, receiving steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the establishing, identifying, finding, using, directing, retrieving, providing, copying, replacing, determining, deleting, enabling, mounting, obtaining, forwarding, receiving steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the establishing, identifying, finding, using, directing, retrieving, providing, copying, replacing, determining, deleting, enabling, mounting, obtaining, forwarding, receiving steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
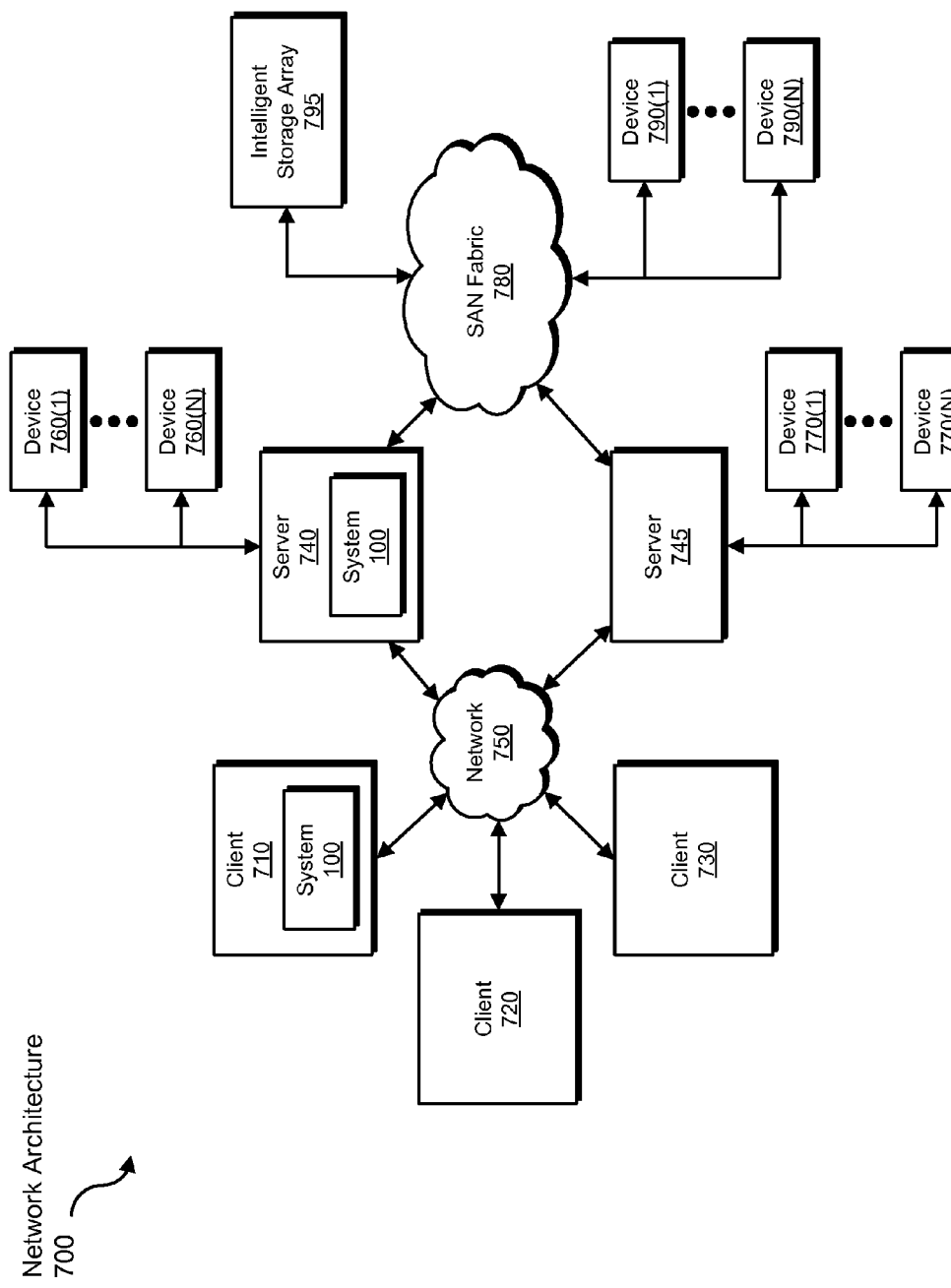
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the establishing, identifying, finding, using, directing, retrieving, providing, copying, replacing, determining, deleting, enabling, mounting, obtaining, forwarding, receiving steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for facilitating file archiving.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, archiving module 108 in FIG. 1 may enable a computing device to transform a file stored in a primary file system into a symbolic link that directly or indirectly references an archived file.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for facilitating file archiving, at least a portion of the method being performed by a computing device comprising at least one processor, the method comprising:
   establishing a UNIX proxy file system that facilitates file archiving for a UNIX primary file system that does not support file archiving by enabling a Data Management Application Programming Interface ("DMAPI") for the UNIX proxy file system;
   identifying a request to archive a file stored in the UNIX primary file system;
   copying the file to the UNIX proxy file system to enable the UNIX proxy file system to initiate an archiving procedure that archives the file in an archive file system and uses the DMAPI to create a transparent placeholder that references the file in the UNIX proxy file system;
   replacing the file stored in the UNIX primary file system with a symbolic link that identifies the transparent placeholder created in the UNIX proxy file system, wherein the establishing, identifying, copying, and replacing steps are performed such that when an application initiates a request to access the file:
      the symbolic link is found in place of the file at a location in the UNIX primary file system, the symbolic link directing the request to the transparent placeholder stored in the UNIX proxy file system;
      the transparent placeholder stored in the UNIX proxy file system is used to locate the file in the archive file system;
      the file is retrieved from the archive file system to cache the file in the UNIX proxy file system;
      the cached file is provided to the application that initiated the request to access the file.

2. The method of claim 1, wherein the cached file is provided to the application that initiated the request by copying the cached file to the UNIX primary file system to enable the application to access the file in the UNIX primary file system.

3. The method of claim 2, wherein copying the cached file to the UNIX primary file system comprises replacing the symbolic link with the cached file.

4. The method of claim 1, wherein the cached file is provided to the application that initiated the request by providing the cached file directly to the application from the UNIX proxy file system without copying the cached file to the UNIX primary file system.

5. The method of claim 1, further comprising:
   determining that the amount of free storage space in the UNIX proxy file system is below a predetermined threshold;
   in response to the determination that the amount of free storage space in the UNIX proxy file system is below the predetermined threshold, deleting one or more cached files from the UNIX proxy file system.

6. A computer-implemented method for facilitating file archiving, at least a portion of the method being performed by a computing device comprising at least one processor, the method comprising:
- mounting an UNIX archive file system to facilitate file archiving for a UNIX primary file system that does not support file archiving;
- obtaining access to the UNIX archive file system via a Web-based Distributed Authoring and Versioning ("WEBDAV") protocol that exposes the UNIX archive file system to the UNIX primary file system through the use of symbolic links;
- identifying a request initiated by an application to access a file, the request identifying a location where the file is expected to be stored in the UNIX primary file system;
- finding a symbolic link in place of the file at the location in the UNIX primary file system, the symbolic link directing the request to the file stored in the UNIX archive file system;
- forwarding the request to the file stored in the UNIX archive file system as directed by the symbolic link found in place of the file at the location in the UNIX primary file system;
- receiving the archived file from the UNIX archive file system to enable the application to access the file.

7. The method of claim 6, wherein receiving the archived file from the UNIX archive file system to enable the application to access the file comprises copying the archived file to the UNIX primary file system.

8. The method of claim 7, wherein copying the archived file to the UNIX primary file system comprises replacing the symbolic link with the archived file.

9. The method of claim 6, wherein receiving the archived file from the UNIX archive file system to enable the application to access the file comprises streaming the archived file directly to the application without copying the archived file to the UNIX primary file system.

10. The method of claim 6, wherein mounting the UNIX archive file system comprises using a Distributed Authoring and Versioning File System ("DAVFS") driver to mount the UNIX archive file system.

11. A system for facilitating file archiving, the system comprising:
- at least one processor;
- a proxy module programmed to direct the processor to:
  - establish a UNIX proxy file system that facilitates file archiving for a UNIX primary file system that does not support file archiving by enabling a Data Management Application Programming Interface ("DMAPI") for the UNIX proxy file system;
- an identification module programmed to direct the processor to:
  - identify a request initiated by an application to access a file, the request identifying a location where the file is expected to be stored in the UNIX primary file system;
  - find a symbolic link in place of the file at the location in the UNIX primary file system, the symbolic link directing the request to a transparent placeholder stored in the UNIX proxy file system and created by the DMAPI via an archiving procedure initiated by the UNIX proxy file system to archive the file in the archive;
- an archiving module programmed to direct the processor to:
  - use the transparent placeholder stored in the UNIX proxy file system to direct the request to the file stored in an archive;
  - retrieve the file from the archive to cache the file in the UNIX proxy file system;
  - provide the cached file to the application that initiated the request to access the file.

12. The system of claim 11, wherein the archiving module is programmed to direct the processor to copy the cached file to the UNIX primary file system to enable the application to access the file in the UNIX primary file system.

13. The system of claim 11, wherein the archiving module is programmed to direct the processor to replace the symbolic link with the cached file.

14. The system of claim 11, wherein the archiving module is programmed to direct the processor to provide the cached file directly to the application from the UNIX proxy file system without copying the cached file to the UNIX primary file system.

15. The system of claim 11, further comprising a management module programmed to direct the processor to:
- determine that the amount of free storage space in the UNIX proxy file system is below a predetermined threshold;
- delete one or more cached files from the UNIX proxy file system in response to the determination that the amount of free storage space in the UNIX proxy file system is below the predetermined threshold.

* * * * *